(12) United States Patent
Richardson (10) Patent No.: US 8,641,257 B2
(45) Date of Patent: Feb. 4, 2014

(54) OPTIC SYSTEM FOR LIGHT GUIDE WITH CONTROLLED OUTPUT

(75) Inventor: Brian E. Richardson, Morgan Hill, CA (US)

(73) Assignee: Rambus Delaware LLC, Brecksville, OH (US)

( * ) Notice: Subject to any disclaimer, the term of this patent is extended or adjusted under 35 U.S.C. 154(b) by 247 days.

(21) Appl. No.: 13/143,341

(22) PCT Filed: Dec. 31, 2009

(86) PCT No.: PCT/US2009/006763
§ 371 (c)(1),
(2), (4) Date: Jul. 5, 2011

(87) PCT Pub. No.: WO2010/077367
PCT Pub. Date: Jul. 8, 2010

(65) Prior Publication Data
US 2011/0267838 A1    Nov. 3, 2011

Related U.S. Application Data

(63) Continuation-in-part of application No. 12/319,171, filed on Jan. 2, 2009, now Pat. No. 8,272,770, and a continuation-in-part of application No. 12/319,172, filed on Jan. 2, 2009, now Pat. No. 8,152,352.

(51) Int. Cl.
*F21V 7/04*    (2006.01)

(52) U.S. Cl.
USPC ............ 362/615; 362/616; 362/623; 362/624

(58) Field of Classification Search
USPC .................... 362/97.1, 296.01, 607, 616, 615
See application file for complete search history.

(56) References Cited

U.S. PATENT DOCUMENTS

| 223,898 A | 1/1880 | Edison |
| 2,971,083 A | 2/1961 | Phillips |
| 4,566,935 A | 1/1986 | Hornbeck |
| 4,596,992 A | 6/1986 | Hornbeck |
| 4,615,595 A | 10/1986 | Hornbeck |
| 4,662,746 A | 5/1987 | Hornbeck |
| 4,710,732 A | 12/1987 | Hornbeck |
| 4,956,619 A | 9/1990 | Hornbeck |
| 5,028,939 A | 7/1991 | Hornbeck |
| 5,221,987 A | 6/1993 | Laughlin |
| 5,319,491 A | 6/1994 | Selbrede |
| 5,396,350 A | 3/1995 | Beeson |
| 5,467,208 A | 11/1995 | Kokawa |
| 5,631,895 A | 5/1997 | Okada |

(Continued)

FOREIGN PATENT DOCUMENTS

| EP | 0969305 A1 | 1/2000 |
| EP | 0969306 A1 | 1/2000 |

(Continued)

*Primary Examiner* — Anabel Ton
(74) *Attorney, Agent, or Firm* — Renner, Otto, Boisselle & Sklar, LLP (57) ABSTRACT

A light guide with optics guides light exiting the guide. The device achieves accurate control of the reflected light by extracting light from a limited area of the light guide. The configuration of the reflectors used for the selective extraction determines the nature of the output light. The reflectors may be located on a side of the light guide opposite to an output side of the light guide.

12 Claims, 11 Drawing Sheets

(56) References Cited

U.S. PATENT DOCUMENTS

| | | | |
|---|---|---|---|
| 5,953,469 A | 9/1999 | Zhou | |
| 5,995,690 A | 11/1999 | Kotz | |
| 6,040,937 A | 3/2000 | Miles | |
| 6,350,041 B1 | 2/2002 | Tarsa | |
| 6,421,103 B2 | 7/2002 | Yamaguchi | |
| 6,421,104 B1 | 7/2002 | Richard | |
| 6,595,652 B2 * | 7/2003 | Oda et al. | 362/609 |
| 6,674,562 B1 | 1/2004 | Miles | |
| 6,704,079 B2 | 3/2004 | Minoura | |
| 6,768,572 B2 | 7/2004 | Romanovsky | |
| 6,867,896 B2 | 3/2005 | Miles | |
| 6,988,301 B2 | 1/2006 | Takeuchi | |
| 7,080,932 B2 | 7/2006 | Keuper | |
| 7,108,415 B2 | 9/2006 | Hayakawa | |
| 7,123,216 B1 | 10/2006 | Miles | |
| 7,177,498 B2 | 2/2007 | Cizek | |
| 7,286,296 B2 | 10/2007 | Chaves | |
| 7,345,824 B2 | 3/2008 | Lubart | |
| 7,447,397 B1 | 11/2008 | Maki | |
| 8,152,352 B2 * | 4/2012 | Richardson | 362/615 |
| 8,272,770 B2 * | 9/2012 | Richardson | 362/605 |
| 2002/0006248 A1 | 1/2002 | Makino | |
| 2002/0031294 A1 | 3/2002 | Takeda | |
| 2002/0044720 A1 | 4/2002 | Brophy | |
| 2002/0105709 A1 | 8/2002 | Whitehead | |
| 2005/0221473 A1 | 10/2005 | Dubin | |
| 2005/0248827 A1 | 11/2005 | Starkweather | |
| 2006/0070379 A1 | 4/2006 | Starkweather | |
| 2006/0182381 A1 | 8/2006 | Creemers | |
| 2007/0133224 A1 | 6/2007 | Parker | |
| 2008/0247169 A1 | 10/2008 | Zou | |

FOREIGN PATENT DOCUMENTS

| | | |
|---|---|---|
| EP | 1215526 A1 | 6/2002 |
| EP | 1291833 A2 | 3/2003 |
| JP | 02002229017 A | 8/2002 |

* cited by examiner

OPTIC SYSTEM FOR LIGHT GUIDE WITH CONTROLLED OUTPUT

CROSS REFERENCE TO RELATED APPLICATIONS

This application is a continuation-in-part of and claims the priority benefit of U.S. patent application Ser. No. 12/319,171, filed Jan. 2, 2009, entitled "TIR Switched Flat Panel Display" and is a continuation-in-part of and claims the priority benefit of U.S. patent application Ser. No. 12/319,172, filed Jan. 2, 2009, entitled "Optic System for Light Guide With Controlled Output," each of which is incorporated by reference herein.

FIELD OF THE INVENTION

This invention relates generally to light display devices, and more particularly may include an optical system to control the direction light travels as it exits a light guide.

BACKGROUND OF THE INVENTION

Many products require an optical system to spread light over a large area and control the direction of the light as it exits the system. Recent improvements in the performance of LEDs, coupled with a concurrent reduction in the cost of production, have made LEDs a more viable option for many applications. However, many applications; such as LCD backlights, signs with backlights, overhead lighting, and automotive lighting; require the concentrated light that is generated by an LED to be spread over a large area, while still controlling the direction of the light. These applications require an improved optic system to provide the desired light control.

Displays based on LCD technology have been evolving for decades. Numerous patent references based on improvements to the basic technology are now available. However, current art displays still have several shortcomings. The chief shortcoming of current art devices is excessive energy consumption. A 65" diagonal HDTV LCD TV typically draws around a half of a kilowatt. This is a result of the poor efficiency of the technology.

One way to improve the efficiency of LCD displays is to direct as much as possible of the available light from the light source toward the area most easily seen by the viewer. With a hand held display device, where power consumption is clearly an important consideration, a narrowly angled light directed towards the viewer is desired.

In a standing application, such as a TV, it is desirable to have the highest intensity segment of the light projected in a direction normal to the surface of the display. It is also important to provide a significant amount of light to the left and right of normal. This is required for viewers that are not in the optimal (normal to the screen) viewing position. It is also desirable in these applications to reduce the amount of light that is projected above and below the angel normal to the screen. If the light that is typically directed in the off normal directions is re-directed to the preferred angles, the intensity of the light transmitted in the preferred directions would be greater.

Three groups of prior art references have addressed the control of light to LCD type displays. Among these, prism type "brightness enhancing films" (BEFs), comprise the most common class. One example of a BEF device is U.S. Pat. No. 5,467,208, "Liquid Crystal Display" by Shozo Kokawa, et al., issued Nov. 14, 1995. This reference discusses the prior art of prism type films and discloses improvements to the art. One drawback to prism films is that they have only limited control of the angles of the light output. Changes to the prism features result in only slight variations in the light output. The prism films are also limited to a two dimensional structure. If an application requires control of the light in three dimensions, at least two BEFs must be deployed.

A second class of prior art is exemplified by U.S. Pat. No. 6,421,103, "Liquid Crystal Display Apparatus . . . " by Akira Yamaguchi, issued Jul. 16, 2002. The Yamaguchi reference discloses another device to control light as it enters an LCD panel. The patent discloses light sources, a substrate (not used as a light guide), apertures, and reflective regions on the substrate. The light is either reflected by the reflective surface or passes through the apertures. The light that passes through the apertures is captured by a lens used to control the direction of the light. Yamaguchi teaches restriction of the angle of the output light to concentrate more light directly at the viewer of an LCD type display. The Yamaguchi device provides much greater control of the output light than can be had with a BEF device. But a drawback to the Yamaguchi device is that it is extremely inefficient. Light must reflect off of the reflective surface many times before it exits the aperture. Even when the reflective surface is made with a high reflectance material, the losses in intensity are substantial. Therefore while the control of light with this invention is superior to that of BEF devices, the efficiency is much poorer.

U.S. Pat. No. 5,396,350, "Backlighting Apparatus . . . " by Karl Beeson, issued Mar. 7, 1995; and U.S. Pat. No. 7,345,824, "Light Collimating Device" by Neil Lubart, issued Mar. 18, 2008; disclose devices in the third class of light control optics for LED light source devices. The Beeson and Lubart references disclose a reflective structure on the side of the light guide. The range of control of these reflective structures is limited, and is not equivalent to the control afforded by devices such as Yamaguchi. Further, the reflective structures are positioned very close to the LCD panel, which allows defects in their output to be easily seen by the viewer of the display.

SUMMARY OF THE INVENTION

Various aspects include a light guide to guide light. Some embodiments include an optic system for a light guide that controls the angle of the light as it exits the system. It may be used in many applications from LCD to overhead lighting. The LCD displays are of the type used in cellular phones, laptop computers, computer monitors, TVs and commercial displays. The light guide may transmit light from the light guide at discrete points and/or over areas. Using the extraction elements in combination with a reflector, the output light of the device can be controlled to be parallel, divergent or convergent. The reflectors can be two dimensional or three dimensional.

An advantage of the optic system of the present invention is that it accurately controls the angles of the output light.

Another advantage of the optic system of the present invention is that it transmits light more efficiently relative to power consumption than do prior art devices.

Yet another advantage of optic system of the present invention is that it is simple in construction, and therefore easy and economical to manufacture.

These and other objectives and advantages of the present invention will become apparent to those skilled in the art in

DETAILED DESCRIPTION OF THE INVENTION

Figure 1:
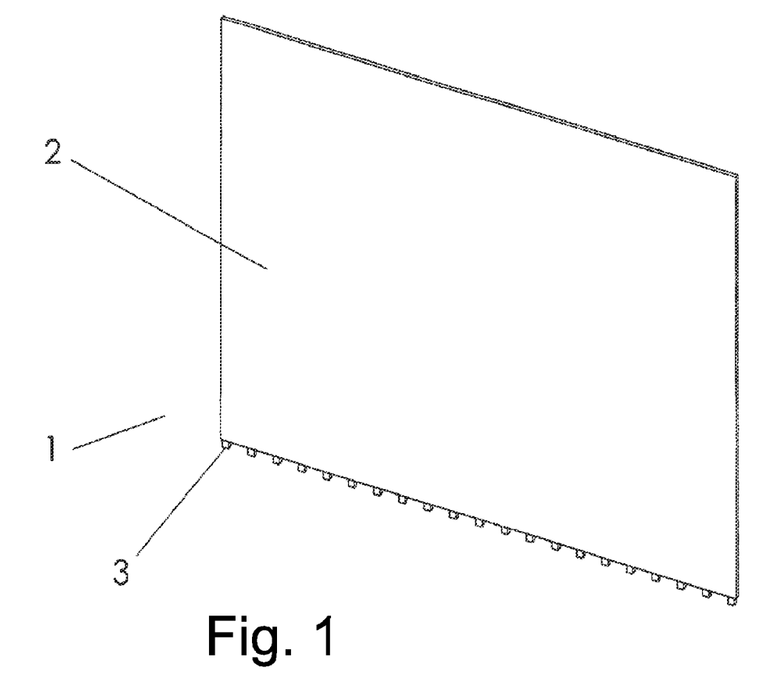
FIG. 1 is a perspective view of the light guide with optics of the present invention.

Referring first to FIG. 1, the light guide assembly 1 of the present invention comprises a light guide 2 with a planar surface and a plurality of LEDs 3. The LEDs 3 may be located along a surface, such as a lower edge of the light guide 2. The number of colors of LEDs 3 and the side of the light guide 2 where the LEDs 3 are located may be a function of the size, shape and application of the light guide 2. The LEDs 3 may be situated on more than one side of the light guide 2. The LEDs 3 may require electronics to drive them at the proper level. A person knowledgeable in LED driver electronics could devise many different circuits to accomplish this task. The embodiment illustrated in FIG. 1 comprises a total of 27 LEDs 3 shown generally equally spaced along the bottom edge of the light guide 2. It should be recognized that other types of light sources such as a laser, incandescent light, fluorescent light, or even natural light, could suffice in the place of the LEDs 3.

Figure 2:
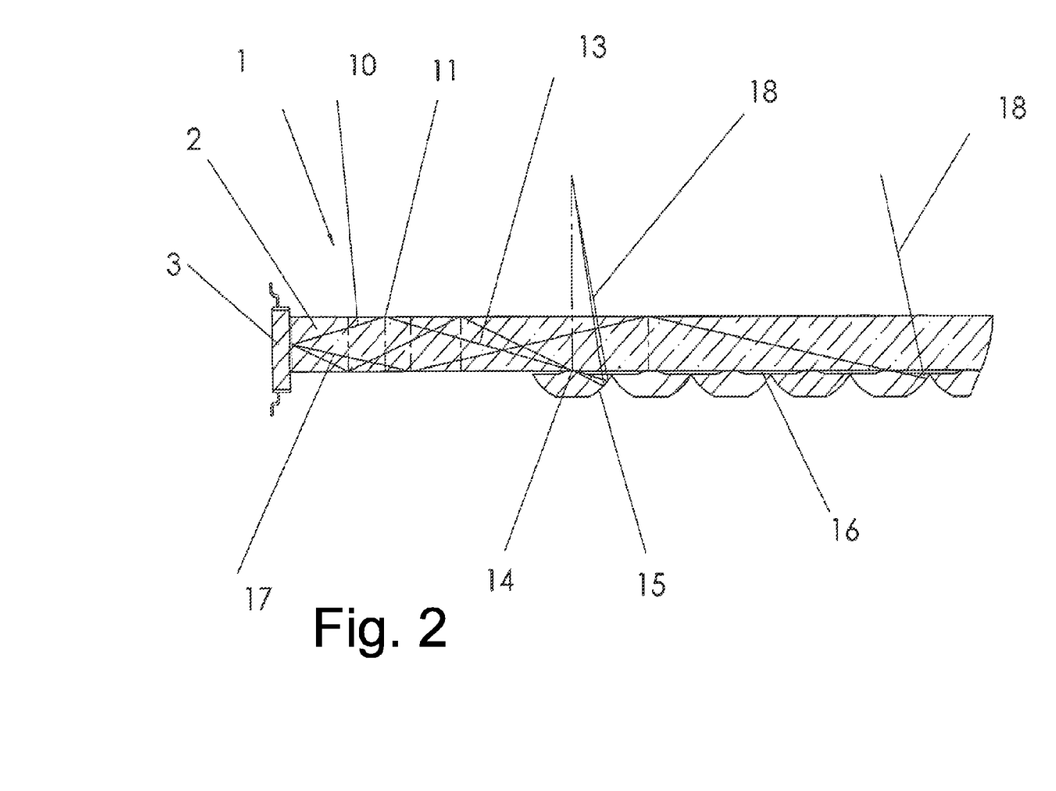
FIG. 2 is a partial, magnified side view of the light guide with optics shown in FIG. 1.

The light guide 2 is shown in a magnified side view in FIG. 2. FIG. 2 shows a sampling of light rays 17 emanating from the LED 3. Upper light ray 10 is depicted as striking the upper surface 11 of the light guide 2. When the contact or incident angle of light ray 10 with the surface of the light guide 2 is shallow, the light reflects off of the surface of the light guide 2. This reflection is governed by the equation:

$$A = \arcsin(Ns/Nlg)$$

Where Nlg is the index of refraction of the light guide and Ns is the index of refraction of the medium outside the light guide. An angle "A" is an angle from normal to the surface of the light guide and is defined by Ns and Nlg. An angle of incidence may be defined as 90°—A.

For air or another low index material, Ns may be 1.35 or less. For a plastic or glass light guide 2, Nlg might be 1.5. Angle A for these values may be approximately 64°. An angle of incidence below which light may be totally internally reflected might be approximately 26 degrees.

If light strikes the surface of the light guide 2 at an angle greater than A (or less than 90 degrees—A), light will reflect off of the surface, in total internal reflection (TIR). If the angle of incidence is greater than 90 degrees—A, at least a portion of the light may pass through the surface (e.g., upper light guide surface 11) and may be refracted. In the example shown, reflected light 13 continues in a downward direction where it encounters a window to a reflector disposed on a contact dome 14. The contact dome 14 is preferably the same or greater in index of refraction than the light guide 2. If the indexes of the light guide 2 and the contact dome 14 are the same, the light 13 travels from the body of the light guide into the contact dome at substantially all angles of incidence. If the indexes of refraction are slightly different, the light 13 may be refracted. If the indexes are much different, and the contact dome 14 has a lesser index of refraction, light might reflect from the "window" region. For most applications, it is undesirable to have any light TIR in the window where the contact dome 14 makes contact with the light guide 2. Selecting a contact dome 14 with an index of refraction equal to or greater than that of the light guide 2 may aid passage of the light from light guide 2 to contact dome 14. Choosing a contact dome 14 having the same index of refraction as the body of the light guide may aid passage of light reflected by the contact dome back into the body of the light guide.

The upper reflected light 13 continues through the contact dome 14 and strikes a reflector 15. In some embodiments, the surface of the reflector 15 may be coated with a reflective material to reflect the light. The reflective material could be aluminum, silver, a dielectric interference type mirror, or other reflective materials or methods. If the reflector 15 is configured with angles that fall within the stated TIR formula, the reflector 15 may be uncoated. The incident light 13 reflects off the surface of the reflector 15.

Figure 9:
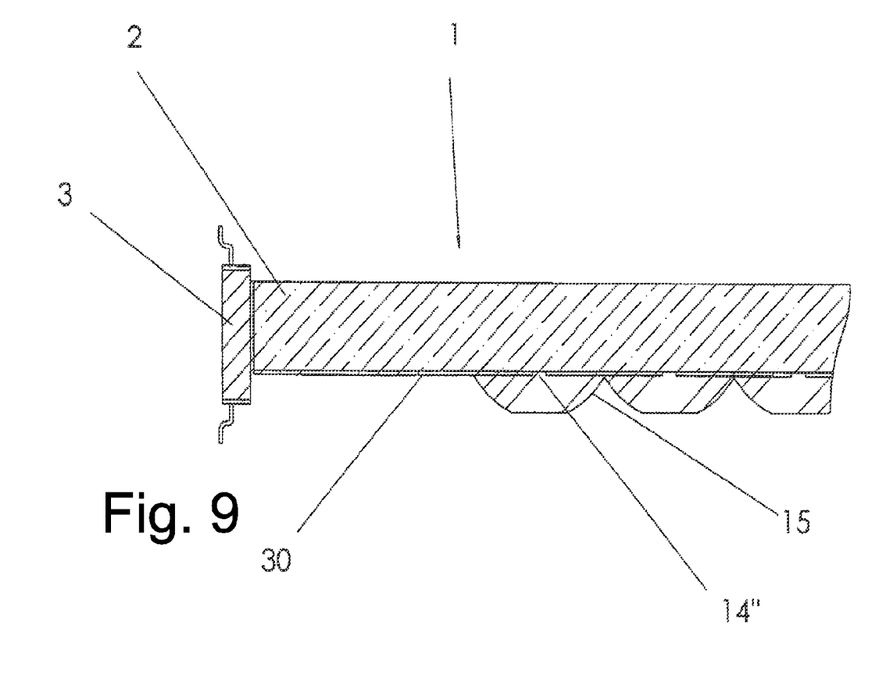
FIG. 9 shows a magnified side view of another construction of the optic system.

In some embodiments, the reflector 15 structures are at least partially optically isolated from light passing from the light guide 2 from regions other than the contact window between light guide 2 and contact dome 14. In the configuration illustrated in FIG. 2, the isolation is accomplished by providing a slight air gap 16 between the light guide 2 and the structure comprising the reflectors 15. (An alternative method, discussed below with reference to FIG. 9, is to install a layer of a low index material between the light guide 2 and the reflector 15 structure.)

In such cases, an angular dependence of reflectivity may be created, such that low angle light is reflected off the portions of the surface having an air gap, while contact windows transmit substantially all incident light to contact dome 14.

The shape of the reflectors 15 may determine the direction the light is reflected back into light guide 2 and therefore the nature of the output light output by light guide 2. FIG. 2 illustrates the reflector 15 as being generally elliptical. An ellipse shaped reflector 15 focuses the light to a point, or causes the light to exit the reflector 15 at multiple angles. If reflector 15 is parabolic shaped, the light exiting the light guide 2 may be generally parallel for a contact window that approaches a "point source" of the reflector. If an elliptical reflector or parabolic reflector is chosen, the focal point of the reflectors could be located at the contact window where the contact dome 14 and the light guide 2 meet. Many other shapes could be used for the reflector 15, the choice being dependent on a desired angular output of the light.

Figure 3:
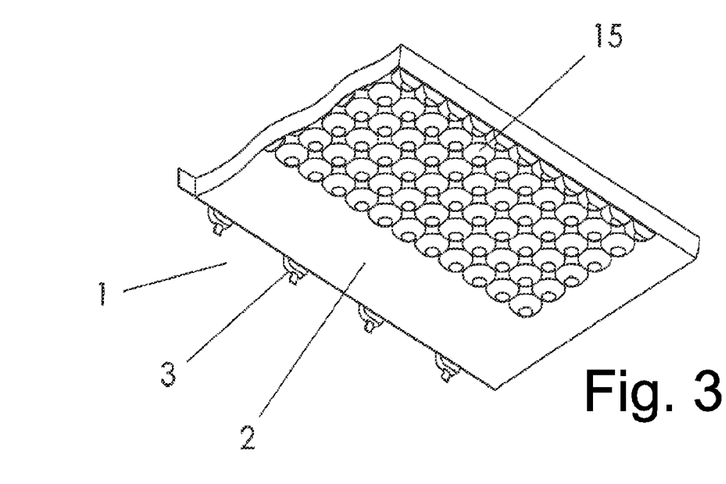
FIG. 3 illustrates three dimensional type reflectors.
Figure 4:
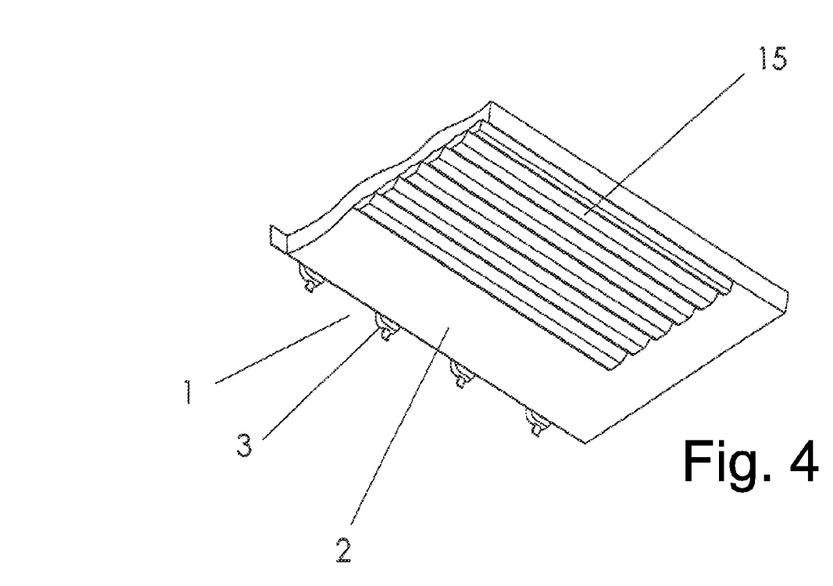
FIG. 4 shows two dimensional type reflectors.

Referring now to FIG. 3, the reflectors 15 are shown as three dimensional type reflectors. The reflectors 15 could as easily be selected to be two dimensional, linear type reflectors, such as that shown in FIG. 4. Again, the choice of which type of reflector 15 is used depends on the application being considered. A user could also select many combinations of reflector shapes, and could employ them in either a two dimensional or three dimensional type configuration. Both the two dimensional and the three dimensional reflectors are shown as an array of reflectors 15 in FIGS. 3 and 4. Those skilled in the art will recognize that many other types of reflector arrays could also be deployed.

Figure 5:
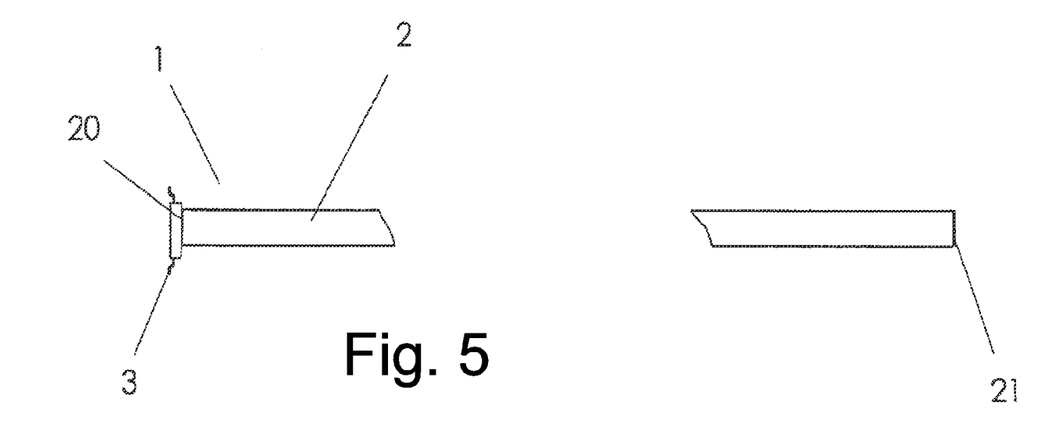
FIG. 5 is a broken side view of the light guide, LCD, and end reflectors.

FIG. 5 shows a magnified side view of the light guide 2, an LED 3, and the end reflectors 20 and 21. Light will often travel through the light guide from the LED 3 and not reflect off a contact dome 14 that is in an on position and therefore extracting light from the light guide 2. In that situation, the light would travel the full length of the light guide 2. When the light reaches the distal end of the light guide 2, the end opposite the LEDs 3, the light is reflected off the end reflector 21. The reflection redirects the light in the opposite direction through the light guide 2, back toward the originating LEDs 3. Preferably, the end reflector 21 is formed from a material with high reflectance. Interference type or metal reflectors are two possible alternatives for the end reflector 21. A third possibility would be an angled, retro type reflector.

If the light continues to travel in the light guide 2 without contacting one of the contact domes 14, the light will reach the originating end of the light guide 2, the end where the LEDs 3 are located. At this end of the light guide 2, the light may strike the area between the LEDs 3 or it may strike the LEDs 3. When the light strikes the area between the LEDs 3, it may be reflected by the end reflector 20. If the light guide 2 has only a few LEDs 3, the light may almost always reflect off of the high reflectance end reflector 20. In the cases of the light reflecting off an LED 3, the LED 3 might absorb a portion of the light, and the remainder of the light will be reflected. Light may travel up and down the light guide 2 a number of times before it is extracted by a contact dome 14. This may be the case when there are only a few contact domes 14 in the particular light guide assembly 1. If many of the contact domes 14 were present in the light guide 2, the likelihood of light making more than one or two passes along the light guide 2 may be small. Even in the case of a large number of reflections with the light making multiple passes along the light guide 2, the loss of light may be small. The end reflectors 20, 21 may have reflectance efficiencies of 98% or better, and good quality light guide material absorbs very little light.

Figure 6:
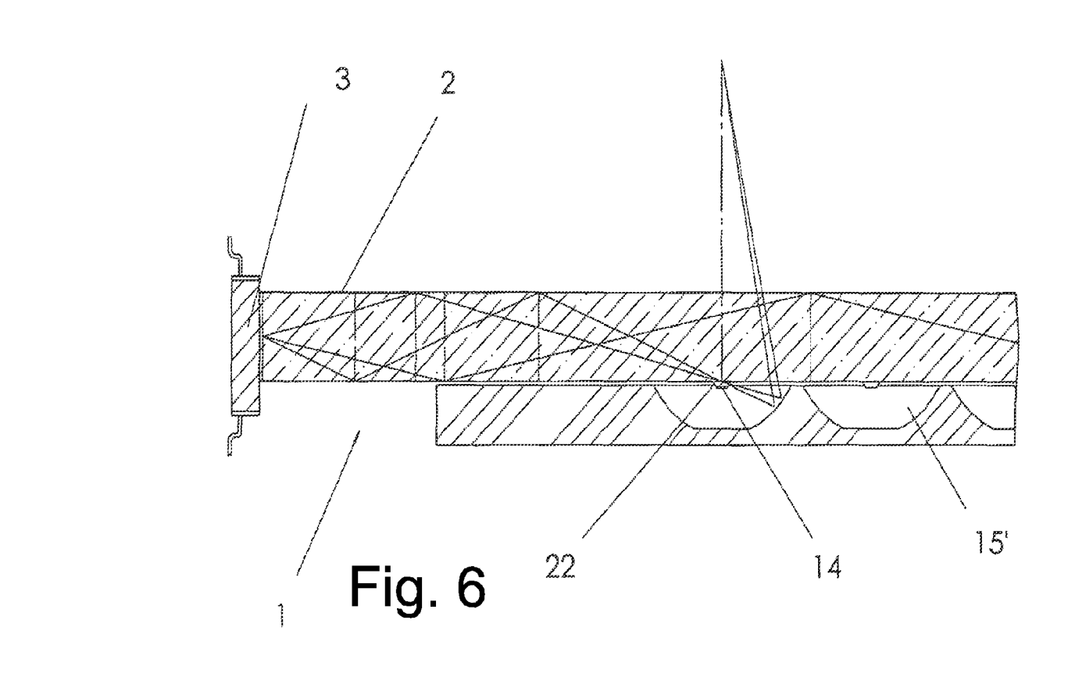
FIG. 6 is a partial, magnified side view of a different construction of the optic system.

An alternate configuration of the light guide assembly 1 is shown in FIG. 6, in which the reflectors 15 are hollow rather than made from a solid material as is typically the case. In this configuration, the contact dome 14 employs a tapered or spherical surface 22 so the upper reflected light 13 passes through the contact dome 14 and continues along a generally straight path toward the surface of the reflector 15 when the contact dome is in the on position. The function of the light guide assembly 1 illustrated in FIG. 6 is the same as for the guide assembly 1 illustrated in FIG. 2, the only difference being the utilization of hollow reflectors 15'.

Figure 7:
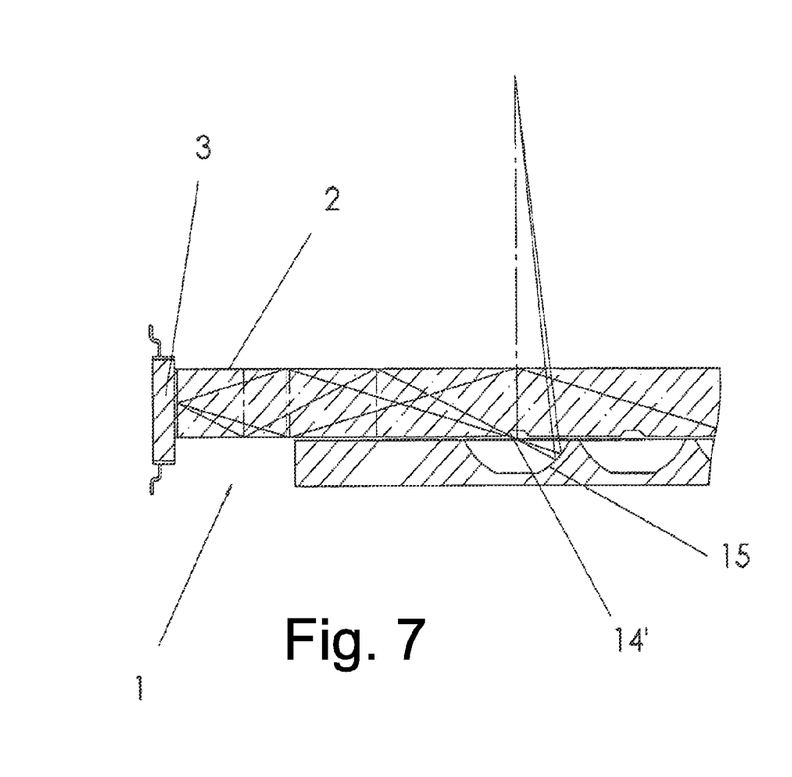
FIG. 7 shows a magnified side view of another construction of the optic system.

Another configuration of the light guide assembly 1 is illustrated in FIG. 7. In the configuration shown in FIG. 7, the features of the contact dome 14 are cut into the surface of the light guide 2. This configuration is, in effect, a negative of the configuration illustrated in FIG. 2. As with the assembly 1 shown in FIG. 6, the function of the light guide assembly 1 shown in FIG. 7 is the same as that shown in FIG. 2. Ease of manufacturing and desired output effects control which reflector construction is chosen for a given application.

Figure 8:
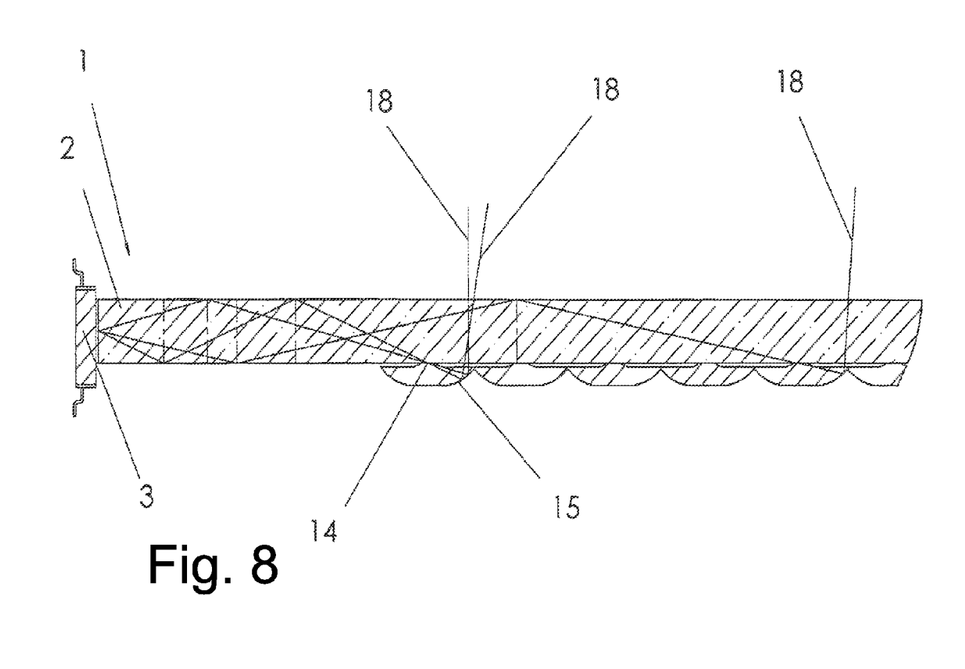
FIG. 8 illustrates an optic system utilizing a divergent type reflector.

FIG. 8 shows a configuration of the light guide assembly 1 in which the output light is spread as opposed to being directed to a focal point. As discussed above, the shape of the reflectors 15 controls the output effect of the light. In FIG. 8, the shape of the reflectors 15 is chosen to scatter the reflected light rays 18, as opposed to directing the light to a focal point.

FIG. 9 discloses an alternative method for optically isolating the reflector 15 structures from the light guide 2. In the configuration illustrated in FIG. 9, a thin layer 30 of a material with a low index of refraction separates the light guide 2 from the structure supporting the reflectors 15. The contact domes 14'=are simply apertures in the thin, low index of refraction layer 30.

The thickness of the low index layer 30 in FIG. 9 is not necessarily to scale. In practice, the low index layer 30 might be microns thick. The thin layer 30 may be deposited with a lithographic process. The reflectors 15 and contact domes 14" might be molded in direct contact with (e.g., welded to) the light guide 2 and the thin layer 30. Adhesive can be used as the low index material 30. Choosing an adhesive as the low index material 30 may be beneficial to the manufacturing process.

Figure 10:
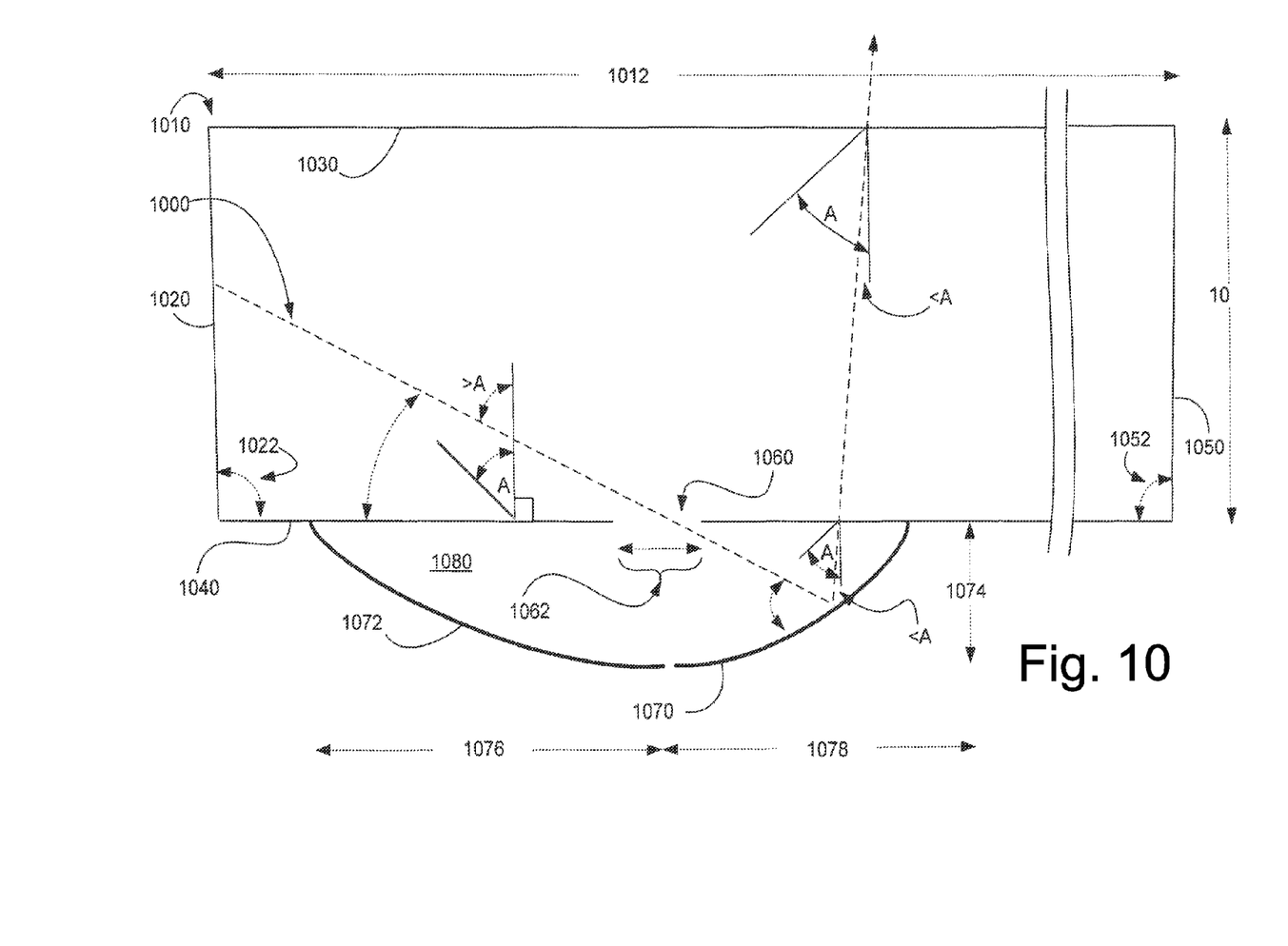
FIG. 10 illustrates an embodiment.

FIG. 10 illustrates an embodiment. Light 1000 may be transmitted through light guide 1010. Light guide 1010 may have a first index of refraction and may include one or more surfaces between light guide 1010 and another medium (e.g., a solid, liquid, air, or even vacuum) having a second index of refraction. Surfaces may be substantially planar, curved, elongated (e.g., having one dimension much greater than another dimension, such as ten times or even 100 times greater) and other shapes. Light guide 1010 may include a first surface 1020 configured to receive light from a light source (not shown), a second surface 1030 (e.g., from which light may exit light guide 1010), and a third surface 1040 associated with various light control apparatus. Light guide 1010 may include one or more fourth surfaces 1050. In some cases, fourth surface 1050 may receive light from a light source. In some cases, fourth surface 1050 may be at least partially mirrored. In certain embodiments, fourth surface 1050 may include a fully reflecting mirror, which may reflect light incident on fourth surface 1050 from within light guide 1010 back into light guide 1010.

Light guide 1010 may be characterized by one or more lengths, such as length 1012 and thickness 1014. Lengths may be chosen according to various application specifications (e.g., cell phone screen, household lighting form factor, TV size, and the like). Lengths may be chosen according to various materials properties (e.g., thickness 1014 may be chosen according to the index of refraction of light guide 1010, an angle associated with TIR in light guide 1010, a specification for light quality exiting light guide 1010 (e.g., a requirement that light be within a few degrees of normal to second surface 1030), and the like.

Light from a light source may be transmitted through first surface 1020 into light guide 1010. First surface 1020 may be at least partially reflecting (e.g., a half mirror), and may be configured to reflect light arriving at first surface 1020 from within light guide 1010 back into light guide 1010. First surface 1020 may be flat, curved, or otherwise shaped. First surface 1020 may be disposed at an angle 1022 with respect to one or more other surfaces of light guide 1010. Angle 1022 may be between 45 and 135 degrees, between 70 and 110 degrees, and/or between 80 and 100 degrees. In some cases, angle 1022 may be chosen according to various predicted angles of internal reflection within light guide 1010.

Light from a light source may be transmitted through fourth surface 1050 into light guide 1010. Fourth surface 1050 may be at least partially reflecting (e.g., a half mirror), and may be configured to reflect light arriving at fourth surface 1050 from within light guide 1010 back into light guide 1010. Fourth surface 1050 may be flat, curved, or otherwise shaped. Fourth surface 1050 may be disposed at an angle 1052 with respect to one or more other surfaces of light guide 1010. Angle 1052 may be between 45 and 135 degrees, between 70 and 110 degrees, and/or between 80 and 100 degrees. In some cases, angle 1052 may be chosen according to various predicted angles of internal reflection within light guide 1010.

Some surfaces (e.g., first surface 1020 and/or fourth surface 1050) may be configured to reflect light (incident on the surface from within light guide 1010) back into light guide 1010 at one or more preferred directions. In some cases, surfaces may reflect light in a manner that minimizes undesirable transmission of reflected light out of light guide 1010. In certain cases, light may be reflected at angles less than an incident angle associated with TIR from another surface (such as second surface 1030 and/or third surface 1040).

Some surfaces (e.g., third surface 1040 and/or optionally second surface 1030) may include "mirrors" whose reflectivity depends on the angle of incidence of incident light (e.g., from within light guide 1010). An angular dependence of reflectivity may be created via control of the indices of refraction on either side of the surface. An angular dependence of the reflectivity may be created via other methods, such as nanostructuring of the surface, the use of surface coatings, and the like. In some cases, surfaces are designed such that incident light at a low angle of incidence (e.g., below 45 degrees, below 30 degrees, below 20 degrees, or even below 10 degrees) is reflected. In some cases, surfaces are designed such that incident light at a high angle of incidence (e.g., normal to the surface, within 2 degrees of normal, within 5 degrees of normal, within 10 degrees of normal, and/or within 20 degrees of normal) may pass through the surface.

A surface of light guide 1010 may include one or more windows 1060. In the example shown in FIG. 10, a window 1060 is disposed in third surface 1040, and light exits light guide 1010 via second surface 1030. Some implementations include tens, hundreds, thousands, millions, or even billions of windows 1060. Certain implementations include one, two, three, five, or ten windows 1060. A window 1060 may be characterized by one or more dimensions 1062, such as a length, width, radius, and/or other dimensions characterizing various aspects of window 1060. Windows 1060 may be characterized as "transparent" to substantially all incident light, and may allow for the transmission of light from within the "body" of light guide 1010 to other structures (such as contact domes, reflectors, and the like).

Reflectors may be a variety of shapes (parabolic, elliptical, linear, curved, flat, and other shapes). A window may have different reflectors associated with different directions of incident light. For example, a shape of reflector 1070 may be chosen according to a preferential receipt of light incident from a direction associated with first surface 1020, and reflector 1072 may be chosen according to a preferential receipt of light incident from a direction associated with fourth surface 1050. Windows 1060 provide for the passage of light through the window to one or more reflectors. In the example shown in FIG. 10, reflectors 1070 and 1072 are disposed in a position to reflect incident light. Reflectors may generally be full mirrors (e.g., completely and/or specularly reflective). Reflectors may be characterized by one or more dimensions. In the example shown in FIG. 10, reflectors may be characterized by dimensions 1074, 1076, and 1078, and may optionally be characterized by other dimensions (e.g., normal to the page).

In the example shown in FIG. 10, third surface 1040 functions as an angularly dependent mirror via a reflectivity induced by different indices of refraction on either side of the surface. Such an implementation may include reflectors 1070 and 1072 disposed on a contact dome 1080 fabricated from the same material as light guide 1010. Reflective portions of third surface 1040 may include an air gap, and window 1060 may include an optically transparent bond between the contact dome 1080 and the "body" of light guide 1010, as described previously. Light having a shallow incidence angle on third surface 1040 (i.e., having an angle with respect to surface normal larger than A) may reflect off third surface 1040.

Light (e.g., light 1000) passing through window 1060 may be reflected by a reflector (e.g., reflector 1070) back toward a surface (e.g., third surface 1040). Such as reflection may result in reflected light 1000 having a large angle of incidence with respect to third surface 1040 and/or second surface 1030, which may result in passage of the light out of light guide 1010 (e.g., via second surface 1030). Such angles are schematically shown in FIG. 10 via smaller angles, with respect to surface normals, than TIR angles A.

Various dimensions (e.g., 1062, 1070, 1074, 1014, and the like) may be chosen according to application requirements. For example, as a radius 1062 of a round window 1060 decreases, light passing through window 1060 may increasingly behave as if arriving at reflector 1070 from a "point source," which may provide for utilization of a specific geometry for reflector 1070 (e.g., parabolic) that results in light exiting light guide 1010 via second surface 1030 at a substantially normal angle to second surface 1030.

Figure 11:
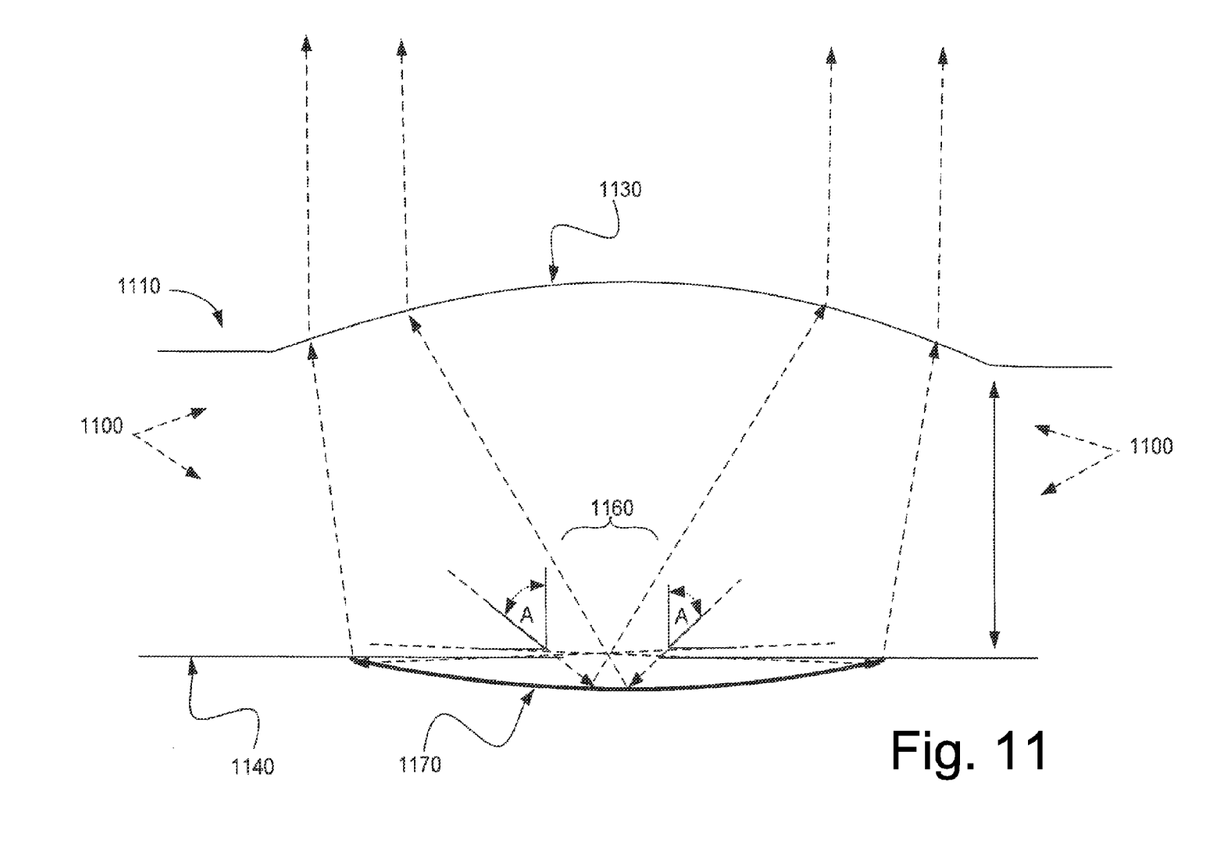
FIG. 11 illustrates an embodiment.

FIG. 11 illustrates an embodiment. Light 1100 may be guided by light guide 1110. Light guide 1110 may include surface 1130 and surface 1140. Surface 1140 may be at least partially reflective, and may reflect incident light that arrives at an angle of incidence shallower (with respect to the surface) or larger (with respect to the surface normal) of an angle A associated with TIR.

Surface 1140 may include a window 1160, which may be in optical communication with a reflector 1170. Reflector 1170 may be characterized by a dimension 1172. In some embodiments, dimension 1172 may be approximately equal to (e.g., within 10% of, 5% of, 2% of, or even 1% of) the size of a pixel of a display device configured to display light guided by light guide 1110. In some embodiments, a light source provides light that is guided by light guide 1110. In certain cases, each pixel associated with a display device may be associated with a window 1160 and/or reflector 1170.

Surface 1130 may include a "lens" or other shape associated with transmission of light through surface 1130. In some cases, a shape of this lens may be chosen to modify an angle of transmittance of light from surface 1130. For example, mildly divergent light may be modified to become parallel and/or normal to a plane associated with light guide 1100.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A light guide system, comprising:
    a light guide comprising a first surface, a second surface, and a third surface, wherein light entering through the first surface propagates along the light guide by total internal reflection between the second surface and the third surface; and
    elements that are arranged with respect to the light guide to disrupt the total internal reflection of the propagating light, each element in physical contact with a respective portion of the second surface, each contact element configured such that a portion of the light that is incident thereon is transmitted therethrough; and a respective reflector positioned to receive the light transmitted through each element, the reflector having a curvature such that the light is reflected back into the light guide and exits the light guide through the third surface;
wherein the elements each comprise a contact portion that physically contacts the second surface and the contact portion is small compared to the reflectors such that the elements function as quasi-point sources.

2. The light guide system of claim 1, wherein the reflectors are configured such that the light is reflected in a predetermined direction and pattern.

3. The light guide system of claim 1, wherein the contact portion of the element is index matched to the light guide.

4. The light guide system of claim 1, additionally comprising a region between the light guide and the elements outside the contact portions thereof, the region lower in refractive index than the light guide.

5. The light guide system of claim 4, wherein the region is configured as a hollow space between the light guide and each reflector.

6. The light guide system of claim 5, wherein the hollow space is substantially coextensive with the reflector.

7. The light guide system of claim 1, wherein:
each of the elements comprises a surface remote from the light guide; and
the respective reflector is located on the surface of the element.

8. The light guide system of claim 1 wherein at least the contact portions of the elements are integral with the light guide.

9. The light guide system of claim 1, additionally comprising a thin layer of a material between the light guide and the reflector, the material lower in refractive index than the light guide.

10. The light guide system of claim 1, wherein the reflector comprises a cylindrical reflective surface.

11. The light guide system of claim 1, wherein the reflector comprises a spherical surface.

12. The light guide system of claim 1, additionally comprising a light emitting diode light source positioned adjacent the first surface of the light guide.

* * * * *